United States Patent
Bacardit et al.

(10) Patent No.: US 6,931,979 B2
(45) Date of Patent: Aug. 23, 2005

(54) REACTION DEVICE FOR BRAKE BOOSTER

(75) Inventors: Juan Simon Bacardit, Barcelone (ES); Bruno Berthomieu, Barcelone (ES); Fernando Sacristan, Barcelone (ES)

(73) Assignee: Robert Basach GmbH, Stuttgart (DE)

( * ) Notice: Subject to any disclaimer, the term of this patent is extended or adjusted under 35 U.S.C. 154(b) by 0 days.

(21) Appl. No.: 10/469,551

(22) PCT Filed: Jan. 25, 2002

(86) PCT No.: PCT/FR02/00321

§ 371 (c)(1),
(2), (4) Date: Aug. 29, 2003

(87) PCT Pub. No.: WO02/062643

PCT Pub. Date: Aug. 15, 2002

(65) Prior Publication Data

US 2004/0094027 A1 May 20, 2004

(30) Foreign Application Priority Data

Feb. 7, 2001 (FR) .............................. 0102105

(51) Int. Cl.$^7$ ................................ F15B 9/10
(52) U.S. Cl. ...................................... 91/369.2
(58) Field of Search ........................ 91/369.2

(56) References Cited

U.S. PATENT DOCUMENTS

| 4,719,842 A | * | 1/1988 | Gautier ....................... 91/369.2 |
| 4,813,338 A | * | 3/1989 | Mortimer et al. ........... 91/369.2 |
| 5,012,723 A | * | 5/1991 | Gauthier ..................... 91/369.2 |
| 5,699,713 A | * | 12/1997 | Mortimer .................... 91/369.2 |
| 5,893,316 A | * | 4/1999 | Inoue et al. ................ 91/369.2 |
| 6,334,384 B1 | * | 1/2002 | Hoerner ...................... 91/369.2 |

* cited by examiner

*Primary Examiner*—F. Daniel Lopez
(74) *Attorney, Agent, or Firm*—Leo H McCormick, Jr.; Warren Comslock (57) ABSTRACT

A reaction device wherein a ratio of input force to output force for a brake booster is sequentially changed during a brake application. An actuation force derived from a pressure differential acts on a movable wall and is communicated through a cage as an output force to an push rod. The output force is a functional ratio of the input force as modified by a reaction disc and elastic means during a brake application. The reaction device functions as a rigid member until the input force reaches a first predetermined level Fd and a first boost ratio is in effect until a second predetermined force Fe is reached and a second boost ratio is in effect until a third predetermined input force level Ff is reached and a third boost ratio is in effect until a fourth predetermined fource level is reached.

7 Claims, 8 Drawing Sheets

Prior Art

REACTION DEVICE FOR BRAKE BOOSTER

The present invention relates mainly to a reaction device for a pneumatic brake booster with modifiable boost and to a brake booster comprising such a device.

BACKGROUND OF THE INVENTION

A pneumatic brake booster is used in a braking system to pneumatically amplify the muscle force applied to a brake pedal. The booster is arranged between the brake pedal and a master cylinder, for example a tandem master cylinder.

It comprises a casing divided into two chambers by a sealed moving wall, this wall being able to move by a pressure differential between the two chambers. The moving wall comprising a pneumatic piston extending radially outwards via a skirt crimped to the external periphery of the piston. The pressure differential between the two chambers is controlled by a three-way valve subject to the movement of an actuating rod controlled by a brake pedal. This three-way valve is arranged in the rear cylindrical part of the pneumatic piston.

The action of the actuating rod is transmitted to the pistons of a master cylinder by means of a push rod via a reaction disc made of an elastomeric material, for example rubber. The reaction disc is a means of combining three forces, a first force from the actuating rod applied via a plunger distributor which is fixed with respect to the actuating rod, the second force from the boost supplied by the pneumatic piston as a result of the movement of the moving wall by the pressure differential, and a third force being the reaction of the hydraulic braking circuit which is transmitted through the push rod. This disc allows the driver of the vehicle to adjust his action on the brake pedal by feeding information back to him from the hydraulic circuit.

The force applied by the driver to the pedal will be known as the input force; the force applied by the actuating rod will be known as the actuating force and the force exerted by the push rod on a piston of a master cylinder, for example a tandem master cylinder, will be known as the output force.

By virtue of this type of brake booster it is possible to obtain a fairly refined relationship between the input force and the output force over a certain range of input force values.

There are devices which allow the boost of the booster to be varied, that is to say which allow the ratio between the input force and the output force to be varied, for example so as to increase the boost above and beyond a certain input force. Patent FR 00/15943 describes a device applied to the rear cylindrical part of the pneumatic piston, the distributor is made up of two parts, a plunger on the same side as the actuating rod and a feeler on the same side as the reaction disc, a prestress spring in a deformable cage is applied between the feeler and the plunger. For an actuating force below the spring prestress, the feeler and the plunger behave like a rigid piece. For an input force that is high enough, the spring compresses, the feeler can then move axially towards the brake pedal allowing the reaction disc to expand towards the brake pedal. There is therefore a reduction in the reaction force transmitted to the actuating rod, and this increases the boost ratio.

However, this device entails significant modification to the internal structure of the booster because of its bulk, although for cost reasons equipment manufacturers are seeking to standardize their products. In addition, they are also seeking to reduce the size of the boosters.

SUMMARY OF THE INVENTION

In consequence, it is an object of the present invention to offer a reaction device that can be fitted to a pneumatic booster of known type.

It is also an object of the invention to offer a reaction device of smaller size.

It is also an object of the present invention to offer a pneumatic brake booster offering a modifiable boost ratio and having a standard piston body.

It is also an object of the present invention to offer a pneumatic brake booster that offers a modifiable boost ratio at low cost.

It is also an object of the present invention to offer a pneumatic brake booster that offers a modifiable boost ratio with small size.

It is also an object of the present invention to offer a pneumatic brake booster offering a modifiable level of boost and with simple design and manufacture.

The present invention advantageously can be mounted in a simple way on pneumatic pistons of boosters of standard form.

The present invention also has the advantage of being of a simple design and having a low cost of manufacture.

The present invention also has the advantage of being small in size.

Thus, these objects are achieved by a reaction device according to the present invention comprising a housing in which there is arranged a reaction disc made of incompressible or practically incompressible materials, delimited:

a) at a first longitudinal end by a first surface, b) at a second end opposite the first end, by a second radially external surface for application of the pneumatic piston and a third surface for application of the plunger delimited by the second surface, and c) by a fourth radial surface extending from the first surface to the second and third surfaces.

The reaction device also comprises at least one elastic means able to be deformed, and means of prestressing the elastic means, the elastic means allowing, for a certain value of input force higher than a certain fixed value, an increase in the volume available for the reaction disc which takes place in a collection of the first and of the second surfaces.

The main subject of the present invention is a reaction device for a brake booster comprising a reaction disc arranged in a receiving housing delimited at a first longitudinal end by a first surface, at a second end opposite the first end, by a second radially external surface and a third surface delimited by the second surface, and by a fourth radial surface extending axially from the first surface to the second and third surfaces, the reaction device also comprising at least one elastic means which can be deformed and which allows the available volume of the reaction disc to increase for an input force above a certain force value, and determining a first boost ratio for an input force below the predetermined value, characterized in that the increase in the volume available for the reaction disc takes place in a collection of the first and of the fourth surfaces and in that the reaction device determines at least a second boost ratio for an input force value higher than the predetermined value.

Another object of the present invention is a reaction device, characterized in that the fourth surface is at least partially defined by a radial end of the said push rod.

Another object of the present invention is a reaction device, characterized in that the first surface is defined by an annular washer and at least one floating piece.

Another object of the present invention is a reaction device, characterized in that the first surface is formed by a piece secured to one axial end of the push rod.

Another object of the present invention is a reaction device, characterized in that an elastic means of which there is at least one, is prestressed so as to provide the reaction device with rigidity for an input force below a certain force value.

Another object of the present invention is a reaction device, characterized in that an reaction device changes the boost ratio according to the value of the input force.

Another object of the present invention is a reaction device, characterized in that the device increases the boost ratio for an actuating force value higher than a certain force value.

Another object of the present invention is a reaction device, characterized in that the prestress of an elastic means is greater than or equal to 150 newtons.

Another object of the present invention is a reaction device, characterized in that an elastic means is a spring.

Another object of the present invention is a reaction device, characterized in that an elastic means is a cylindrical spring.

Another object of the present invention is a reaction device, characterized in that an elastic means is an elastic ring.

Another object of the present invention is a reaction device, characterized in that an elastic means is a conical spring.

Another object of the present invention is a reaction device, characterized in that an annular washer and a floating piece of which there are at least one, form means of prestressing an elastic means of which there is at least one.

Another object of the present invention is a reaction device, characterized in that an annular washer is crimped onto the body of the push rod.

Another object of the present invention is a reaction device, characterized in that an floating piece comprises means of centring an elastic means.

Another object of the present invention is a reaction device, characterized by at least two coaxial elastic means.

Another object of the present invention is a reaction device, characterized in that a first elastic means has a preload lower than the preload of a second elastic means.

Another object of the present invention is a reaction device, characterized in that an floating piece comprises a central first piece and an annular second piece which can move axially one with respect to each other.

Another object of the present invention is a reaction device, characterized by first guide means that collaborate with second guide means of a pneumatic brake booster.

Another object of the present invention resides in a pneumatic brake booster comprising a casing divided into two chambers by a sealed moving wall comprising a pneumatic piston in which there is arranged a three-way valve actuated by an actuating rod which can be connected at a first longitudinal end to a brake pedal and at a second longitudinal end opposite the first end to a distributor, characterized in that the distributor comes into contact with a reaction device as defined previously.

Another object of the present invention resides in a pneumatic brake booster, characterized in that the reaction device defined previously is fixed to the pneumatic piston by means of a washer.

Another object of the present invention is a pneumatic brake booster, characterized in that the washer is fixed by being trapped between a return spring and the pneumatic piston.

Another object of the present invention is a pneumatic brake booster, characterized in that the pneumatic piston comprises guide means collaborating with guide means of the reaction device defined previously.

The present invention will be better understood with the aid of the following description and of the appended figures in which the front and the rear are depicted respectively by the left-hand and right-hand parts of the figures.

BRIEF DESCRIPTION OF THE DRAWINGS

FIG. 12b represents curves of the variation in actuating force as a function of the compression of the elastic means for three different thrust forces and three different reaction disc diameters with a fixed reaction disc elastic modulus which differs from the one used for the measurements depicted on curves 12a.

DETAILED DESCRIPTION OF THE INVENTION

The same references are used in all the figures for the same pieces or the pieces which perform the same function.

All the elements described are pieces which have symmetry of revolution of axis XX'.

The term expansion is understood in this description as being an elastic operation, at the end of which the reaction disc which will be defined hereinafter returns to its initial shape.

Figure 1:
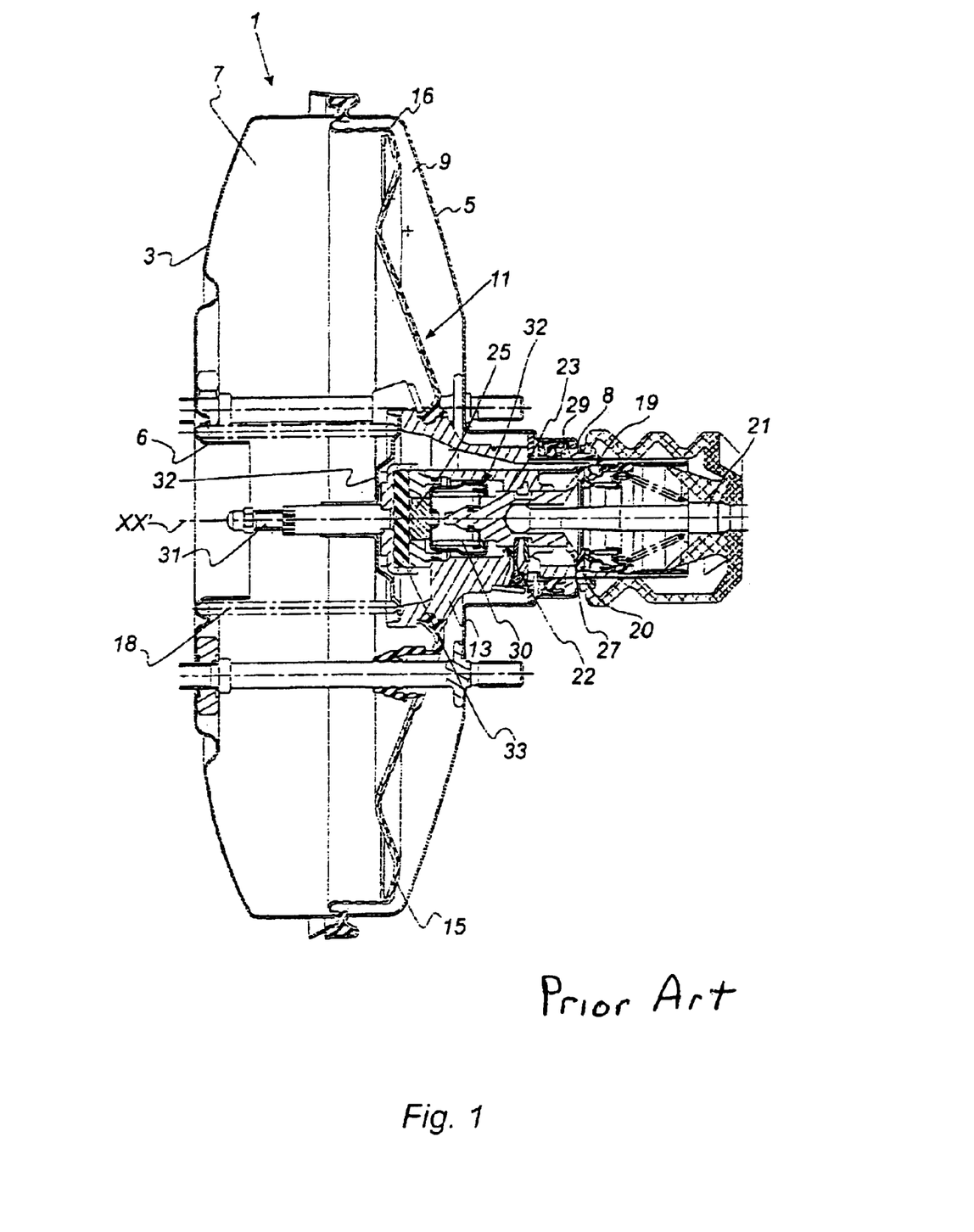
FIG. 1 is a view in longitudinal section of a pneumatic brake booster of known type.

FIG. 1 shows a pneumatic brake booster of known type, comprising a casing 1 formed of a first 3 and of a second 5 shells which are crimped together in a sealed fashion and each of which comprises a central opening 6, 8 facing each other, the interior space delimited by the casing 1 being divided into a front chamber 7 and a working chamber 9 by a sealed moving wall 11. This wall 11 is equipped in its central part with a pneumatic piston 13 extending axially towards the rear and in its radially external part with a skirt 15 crimped to the external periphery of the piston 13. The wall 11 is sealed by means of a rolling seal 16, for example made of elastomer, and fixed to the periphery of the piston 13 and to the periphery of the casing 1. A spring 18 is mounted in compression between the rear face of the shell 3 and the front face of the piston 13 so as to return the wall to the retreated position in the rest phase.

The front chamber 7 is connected by sealed means (not depicted) to a source of partial vacuum. At rest, the working chamber 9 is in communication with the front chamber 7, whereas at the time of braking it can be placed in communication with an environment at atmospheric pressure.

The communications between the two chambers and with the environment are performed by means of a three-way valve 19 arranged in the cylindrical rear part of the pneumatic piston 13. The valve 19 comprises a valve seat 20 borne by an actuating rod 21 connected to a brake pedal (not depicted), a plunger distributor 22 comprising a plunger 23 and a feeler 25, the plunger 23 receiving, in its rear end, a front end of the actuating rod 21 which is the opposite end to the brake pedal end and which carries a first valve 27.

A second valve 29 is formed by the rear periphery of the pneumatic piston 13. The feeler and the plunger are connected by a spring 30 mounted in compression in a deformable cage 32 and having an inside diameter greater than the outside diameter of the feeler and of the plunger. The cage 32 comprises a first sleeve directed towards the rear fixed to the feeler, advantageously by force, and a second sleeve of smaller size facing the first sleeve fixed to the plunger, advantageously by force.

The booster also comprises a push rod 31 actuating a piston of a master cylinder (neither depicted) fixed in front of the booster by means of a washer 32' trapped between the spring 18 and the front face of the piston 13 and in its rear axial end directed towards the brake pedal forming a cup carrying a reaction disc 33 capable, under braking, of collaborating with the front face of the feeler 25, the reaction disc 33 is made of a deformable, practically incompressible, material, for example an elastomer and preferably rubber.

A pneumatic brake booster is, in the known way, characterized by a boost ratio equal to the ratio between the output force (Fs) and the input force (Ft) and which is determined by the ratios of the areas of the reaction disc 33 and of the feeler 25.

For obvious safety reasons, it is desirable to increase this boost ratio when there is a braking action with an input force higher than a determined value, corresponding to an emergency situation, so as to boost the action of the driver on the brake pedal still further.

The booster is therefore characterized by a first and at least one second boost ratio.

Figure 2:
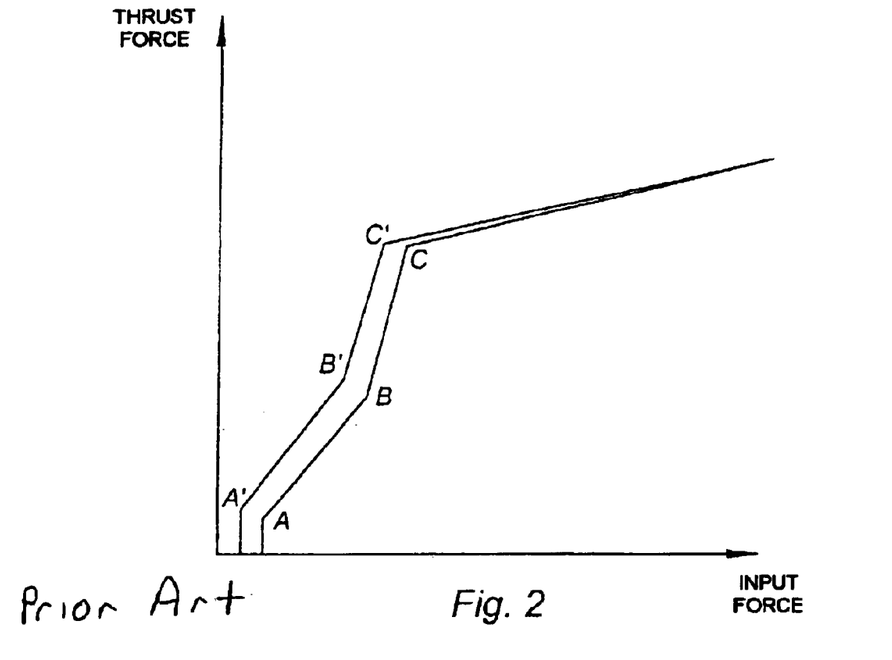
FIG. 2 is a curve representing the variation in the output force of the booster as a function of the input force for a booster of the type with two boost ratios.

We shall now explain the operation of the booster of known type with reference to FIGS. 1 and 2.

At rest, the front chamber 7 and the working chamber 9 are in communication and subjected to the partial vacuum of the front chamber 7.

During braking, the action of the driver on the brake pedal causes the actuating rod to move, causing the communication between the chambers 7 and 9 to close by applying the second valve 29 to the valve seat 20 and by opening the communication between the working chamber and the environment at atmospheric pressure by lifting the first valve 27 off the valve seat 20. A pressure difference therefore arises between the front chamber 7 and the working chamber 9 and this has the effect of carrying the wall 11 towards the master cylinder. The distributor 22 formed of the feeler 25 and of the plunger 23 behaves like a rigid piece, the reaction disc 33 combines the force applied by the actuating rod 21 via the feeler 25, the boost force applied by the pneumatic piston and the reaction of the hydraulic circuit which is transmitted by the push rod 31. The booster provides a first boost ratio (AB).

For sufficient input force, the spring 30 compresses, the feeler 25 is then able to move with respect to the plunger 24 towards the brake pedal, allowing the reaction disc 33 to expand towards the brake pedal.

There is therefore a change in the distribution of contact pressures in the surface of the rubber, reducing the contact pressure between the distributor 22 and the reaction disc 33, corresponding to a second booster ratio (BC).

At the end of the braking phase, the actuating rod 31 moves towards the rear, allowing the entire booster to return to its rest position, and in particular, the reaction disc returns to its initial shape.

Figure 3:
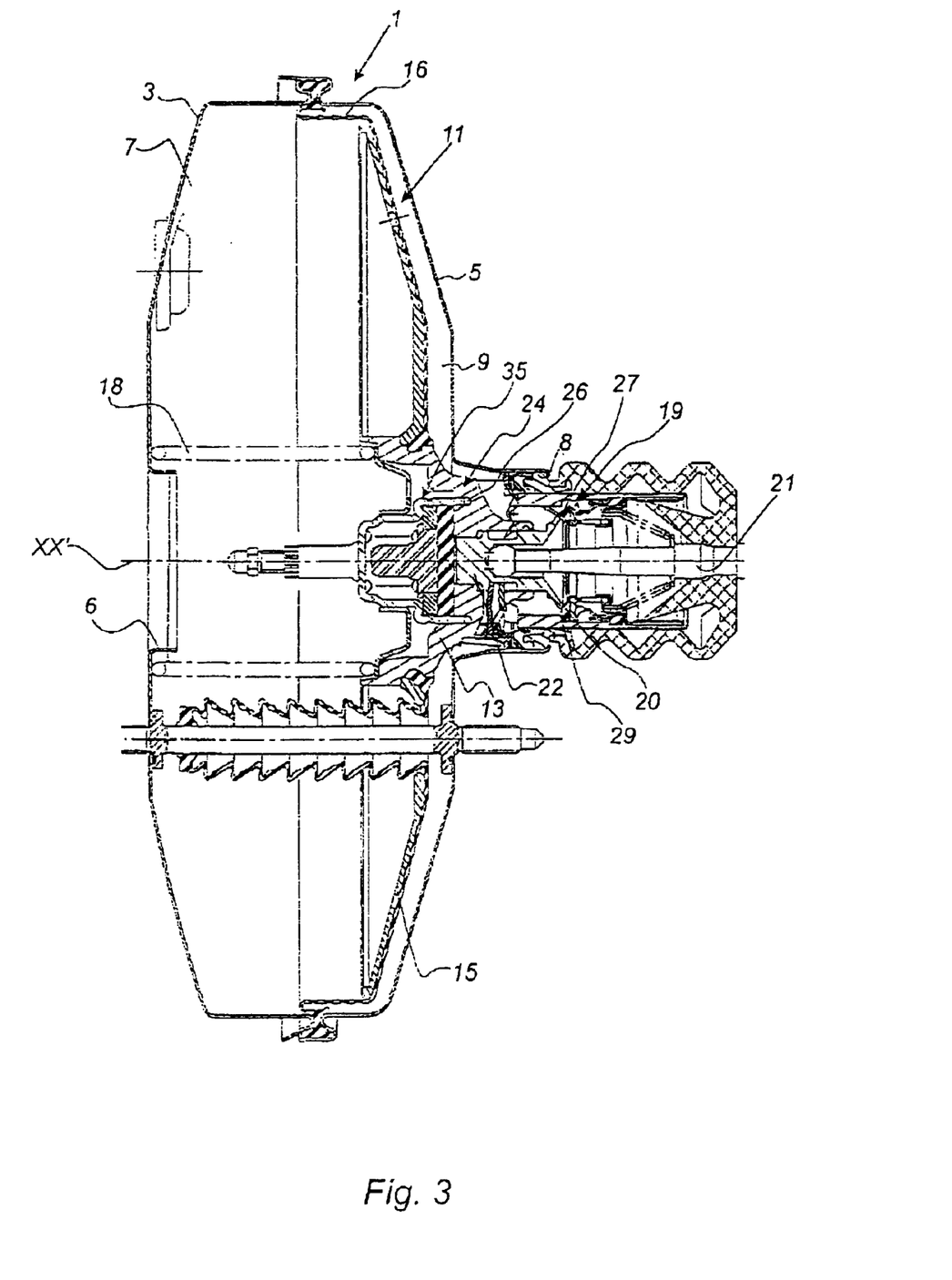
FIG. 3 is a view in longitudinal section of a pneumatic brake booster comprising a first alternative form of a reaction device according to the present invention.

FIG. 3 shows a brake booster equipped with a reaction device according to a first embodiment of the present invention, comprising a casing 1 formed of a first shell 3 and a second shell 5 each of which respectively has a central opening 6, 8 and which is divided into two chambers 7, 9 by a sealed moving wall 11. The moving wall 11 in its central part has a pneumatic piston 13 extending axially towards the rear and in its radially external part has a rigid skirt 15 crimped to the external periphery of the piston 13, sealing being achieved by means of a rolling seal 16 fixed hermetically to the casing 1 and to the pneumatic piston 13.

A spring 18 is mounted in compression between the rear face of the shell 3 and the front face of the piston 13 so as to return it at rest.

The front chamber 7 is connected by sealed means (not depicted) to a source of partial vacuum.

A three-way valve 19 is arranged in the cylindrical part of the pneumatic piston 13 and is controlled by means of a control rod 21 connected to a brake pedal (not depicted). It comprises a valve seat 20 borne by the actuating rod 21 and formed by an annular surface, a spring is mounted in compression resting against the rear face of the valve 19 so as to apply the valve seat 20 to the valves 27, 29.

The action of the actuating rod 21 is transmitted to the hydraulic braking circuit by means of a reaction device 35 and of a plunger distributor 22 coaxial with the actuating rod 21 receiving, in a rear opening of approximately thrustoconical shape, the front end of the actuating rod 21. This rear end forming a first valve 27.

The pneumatic piston 13 comprises a rear cylindrical end forming a second valve 29 and, in its front face, axial-guidance means 24 capable of collaborating with axial-guidance means of the reaction device 35, these advantageously being formed by a radial notch 26.

Figure 4:
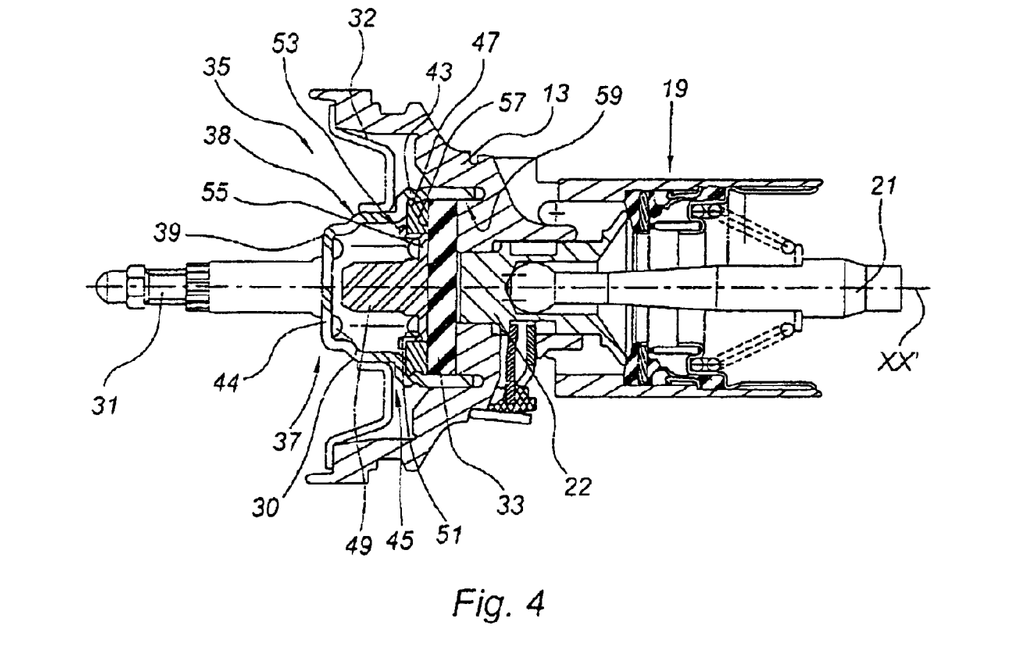
FIG. 4 is a detail view of the reaction device of FIG. 3.
Figure 5:
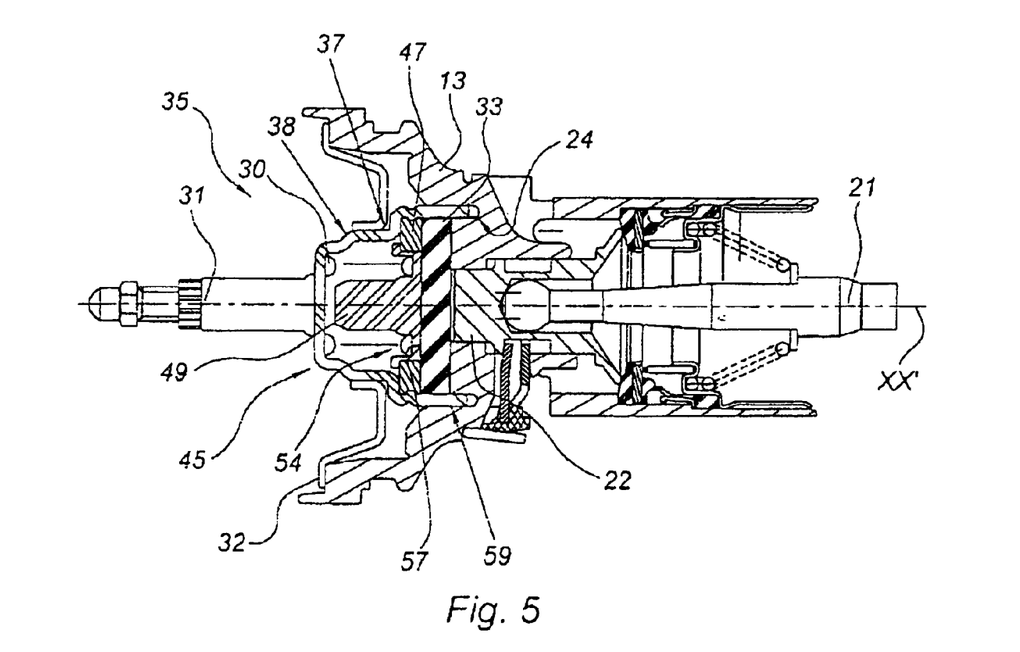
FIG. 5 is a view in longitudinal section of a second alternative form of the first embodiment of a reaction device which can be used in a booster according to the present invention.

FIGS. 4 and 5 show two alternative forms of a first embodiment of a reaction device of the booster of FIG. 3 comprising an elastic means 30, means 45 of prestressing the elastic means 30, and a reaction disc 33. The prestressing means 45 comprise a cage 37 formed by a sleeve 38, an annular washer 47 and a floating piece 49. The sleeve 38 comprises, at a first end facing forwards, a first sleeve of smaller diameter 39 and, at a second end facing backwards, a second sleeve of larger diameter 41 connected to the first sleeve 39 by a shoulder 43, the axial front end of the first sleeve of smaller diameter 39 being closed and forming a base of a push rod 31 coaxial with the actuating rod 21, the sleeve 38 and the push rod 31 being coaxial.

The annular washer 47 coaxial with the push rod 31 is mounted fixedly in the second sleeve 41, resting against the shoulder 43 and advantageously crimped to the internal radial surface of the sleeve 39. The floating piece 49 is mounted in axial translation in the passage 51 made in the washer 47, advantageously mounted coaxially with the plunger distributor 22 and of an outside diameter equal to the inside diameter of the passage 51.

The floating piece 49 comprises retaining means 53 situated some non-zero distance away from the axial ends of the piece 49 and advantageously formed of a flange 55 extending radially outwards and with an outside diameter greater than the inside diameter of the opening 51. In the second alternative form of the first embodiment depicted in FIG. 5, the retaining means 53 also comprise means 54 of centring the spring 30 which are formed by an annular depression 54 made in the front face of the flange 55.

The elastic means 30, advantageously a spring, is mounted in compression between the rear-facing face of the sleeve 39 and the front annular face of the flange 55.

The reaction disc is arranged so that it rests on a face 57 formed by the rear-facing face of the annular washer 47 and by the rear-facing face of the floating piece 49.

The axial dimension of the larger-diameter sleeve 41 is greater than the sum of the axial dimensions of the washer 47 and of the reaction disc 33, leaving a free rear axial end of the sleeve 41 forming the guide means 59 of the reaction device 35 capable of collaborating with the guide means 24 of a pneumatic piston of a booster.

The reaction device is fixed to the pneumatic piston 13 by means of an annular washer 32, the central passage of which advantageously extends axially forwards in the form of a sleeve bordering the smaller-diameter sleeve 39 of the sleeve 37.

We shall describe the operation of the pneumatic brake booster comprising the device 35 according to the present invention.

At rest, the chambers 7 and 9 are subjected to the partial vacuum.

Upon braking, action on the brake pedal moves the actuating rod which closes the communication between the front chamber 7 and the working chamber 9 by applying the second valve 29 to the valve seat 20 then opens the communication between the working chamber 9 and the environment at atmospheric pressure by lifting the first valve 27 off the seat 20. The piston 13 is then carried forwards by the difference in pressure between the two chambers 7 and 9.

The reaction disc 33 then receives the actuating force Fa of the actuating rod via the distributor 22, the boost force Fp of the pneumatic piston 13 which can actually move with respect to the reaction disc by virtue of the axial-guidance means 24 formed by a radial notch, and the reaction force Fr of the hydraulic braking circuit.

For an input force lower than a certain input force Fe, the reaction means 35 behaves like a rigid piece, the reaction device determining a first boost ratio.

For an input force higher than the value of the force Fe, the spring 30 compresses, allowing the floating piece 49 to slide forwards, the reaction disc 33 therefore expands forwards into the opening 51. There is therefore a change to the distribution of contact pressures in the rubber surface, reducing the contact pressure between the distributor 22 and the reaction disc 33 and the reaction device determining a second boost ratio.

For an even higher value of input force, the floating piece 49 comes to rest against the push rod 31 and the booster then provides a boost ratio equal to the first boost ratio obtained for an input force lower than Fe.

The variation in boost ratio depends on the elastic modulus of the rubber of which the reaction disc is made and on the geometry of the reaction disc and of the housing of the reaction disc.

At the end of the braking phase, the actuating rod 21 moves backwards, allowing the entire booster to return to its rest position, and in particular, the reaction disc returns to its initial shape.

Figure 6:
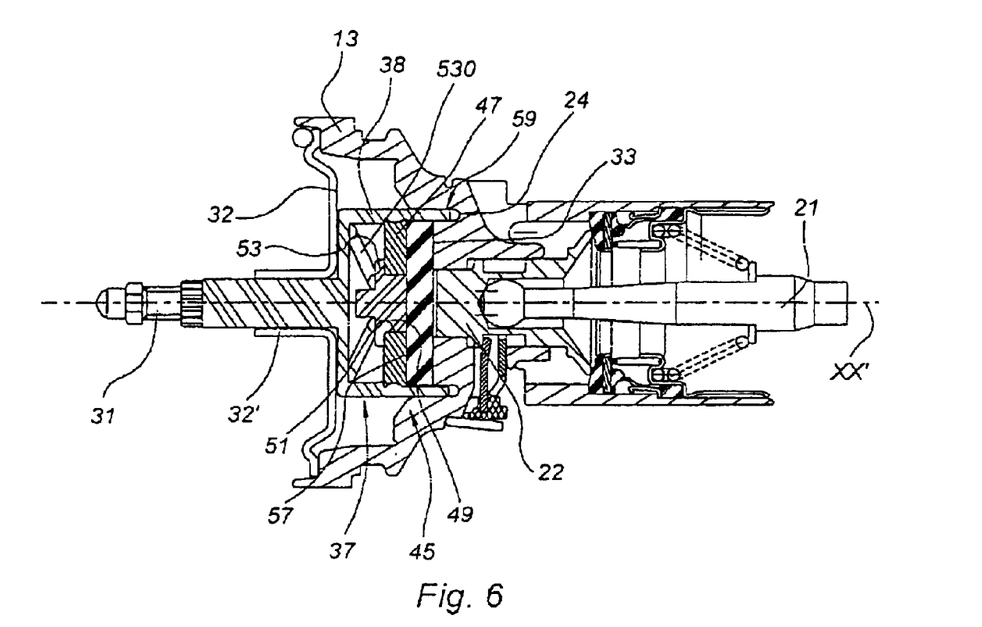
FIG. 6 is a view in longitudinal section of a third alternative form of the first embodiment of a reaction device which can be used in a booster according to the present invention.

FIG. 6 shows a third alternative form of the first embodiment of the reaction device according to the present invention comprising an elastic means 530, means 45 of prestressing the elastic means 530 and a reaction disc 33. The prestressing means 45 comprise a cage 37 formed by a cylindrical sleeve 38 of axis XX' the front axial end of which forms the base of a push rod 31, by an annular washer 47 equipped with a central opening 51, and by a floating piece 49.

The annular washer 47 is mounted fixedly in the sleeve 38, advantageously by crimping to the periphery of the sleeve 38.

The floating piece 49 is mounted, advantageously so it is coaxial with the plunger distributor 22, in axial translation in the opening 51 of the washer 47 and of an outside diameter equal to the inside diameter of the passage 51.

The floating piece 49 comprises retaining means 53 situated a non-zero distance away from the axial ends of the piece 49 and formed by a flange 55 extending radially outwards and with an outside diameter greater than the inside diameter of the opening 51.

The elastic means 530 is advantageously a conical spring with the cone facing forwards mounted in compression between the rear face of the front end wall of the cage 37 and the annular front face of the flange 55. The reaction disc is arranged resting against the face 57 formed by the rear face of the annular washer 47 and by the rear face of the floating piece 49. The reaction device comprises means 59 of guidance with respect to the piston 13 which are capable of collaborating with the guide means 24 of the pneumatic piston 13, formed by the cylindrical rear end of the cage 37.

The reaction device is fixed to the pneumatic piston 13 by means of an annular washer 32, the central passage of which advantageously extends axially forwards in the form of a sleeve bordering the push rod 31.

The way in which the device 135 applied to a brake booster according to the present invention works is the same as the method of operation of the reaction device of FIGS. 4 and 5.

This alternative form of the first embodiment of the reaction device according to the present invention advantageously makes it possible to considerably reduce the axial size of the reaction device.

Figure 7:
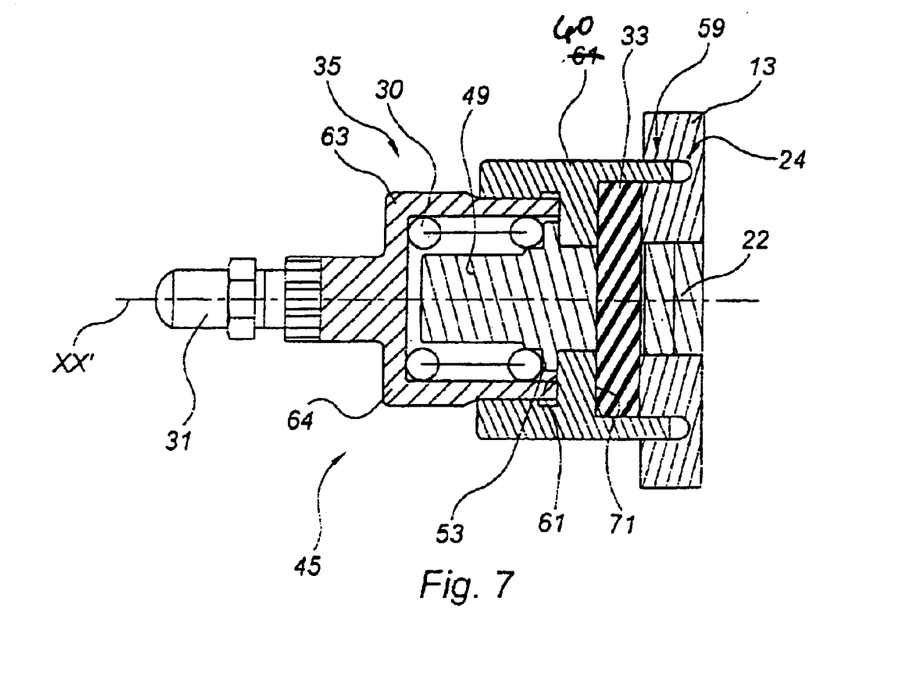
FIG. 7 is a view in longitudinal section of a fourth alternative form of the first embodiment of a reaction device which can be used in a booster according to the present invention.

FIG. 7 shows a fourth alternative form of the first embodiment of the reaction device 35, in which the pneumatic piston 13 and the distributor 22 are depicted in part. The device 35 comprises a reaction disc 33, means 45 of prestressing an elastic means 30 comprising a sleeve 60 equipped with an interior shoulder 61, with a floating piece 49 mounted in translation in the sleeve 60 and of an outside diameter equal to the inside diameter of the passage defined by the shoulder 61, and with a sleeve 63. The sleeve 63 has a front axial end closed off and forming a base 64 of a push rod 31 which is formed integrally with it. The sleeve 63 enters the sleeve 60 via its rear end and is fixed to the sleeve 60, for example by force or by crimping so as to close off the open front end of the sleeve 60.

All the parts of the device of FIG. 7 are coaxial with the axis XX'.

The floating piece 49 includes stop means 53 formed by an annular surface 71 that extends radially outwards.

The reaction disc 33 is mounted so that it rests, on the same side as the rear end of the sleeve 60, against the rear face, and a spring 30 is mounted in compression between the rear face of the front end of the sleeve 63 and the front face of the annular surface 71 of the stop means 53 of the floating piece 49.

The sleeve 60 comprises at its rear axial end guide means 59 capable of collaborating with the guide means 24 formed in the front face of the pneumatic piston 13.

The device 35 also comprises means 59 of guidance with respect to the pneumatic piston 13 which are capable of collaborating with the axial-guidance means 24 of the piston 13.

The way in which the device 35 of FIG. 7 applied to a brake booster according to the present invention works is the same as the method of operation of the device 35 described in FIGS. 5 and 6.

The advantage of this embodiment is the simplicity of manufacture of the reaction device according to the present invention.

Figure 8:
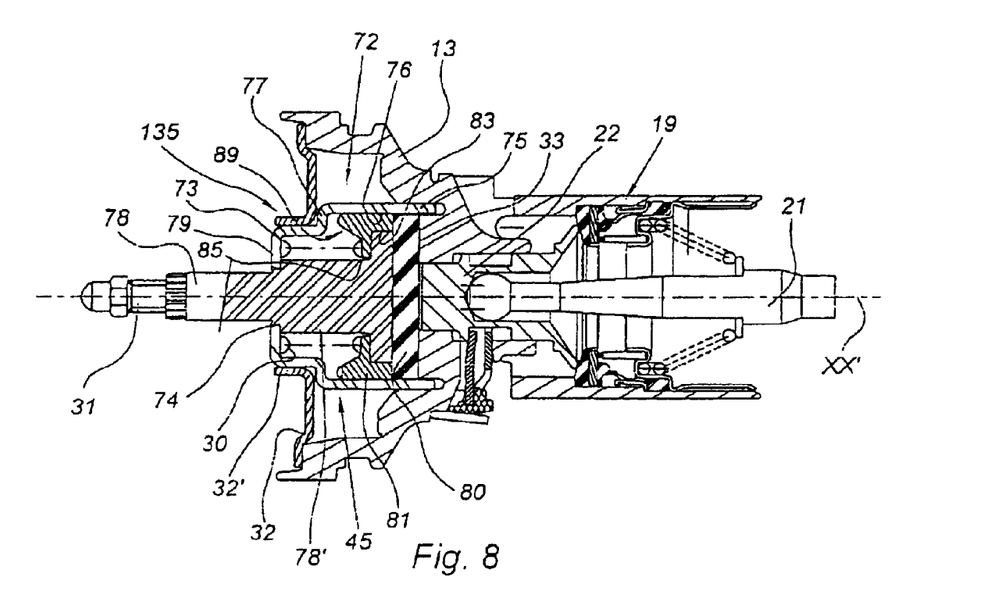
FIG. 8 is a view in longitudinal section of a third embodiment of a reaction device which can be used in a booster according to the present invention.

FIG. 8 shows a second embodiment of a reaction device 135 according to the present invention, comprising a reaction disc 33, an elastic means 30 and means of prestressing an elastic means comprising a sleeve 72 equipped at a first end directed forwards with a first part 73 of smaller diameter and at a second end directed backwards with a second part 75 of larger diameter, the first part 73 being connected to the second part by a shoulder 77. The part 73 of smaller diameter comprises, at a forward facing end, an annular surface 79 extending inwards and delimiting a passage 74.

The push rod 31 comprises at a forward facing first end a first part 78 of smaller cross section and, at a second end which is the opposite end to the first end, a second part of larger cross section 78' forming a base 80 of outside diameter smaller than the inside diameter of the larger-diameter second part 75, the space between the base 80 and the sleeve 75 defining an annular passage 76. The piece 78 is fixed into the passage 74, for example by force-fitting.

The device 135 also comprises means 54 of guidance with respect to the pneumatic piston 13 which are capable of collaborating with the axial-guidance means 24 of the piston 13.

The prestressing means also comprise an annular ring 81 of an outside diameter roughly equal to the inside diameter of the part 75 of the sleeve 72 which part is slideably mounted in the part 75, the ring 81 is pierced towards the rear with a first bore 83 of larger diameter and towards the front with a second bore 85 of smaller diameter, the two bores 83, 85 being connected by a shoulder 87. The inside diameter of the bore 83 is roughly equal to the outside diameter of the part 78' of the push rod 31 and the inside diameter of the bore 85 is roughly equal to the outside diameter of the base 80. The ring 81 also comprises a part 89 at its front end that has a frustoconical interior shape with the cone shape facing forwards. The ring 81 is slideably mounted in the part 75 of the sleeve and around the push rod 21. The elastic means 30, advantageously a cylindrical spring, is mounted in compression between the rear face of the annular surface 79 and the end wall of the part 89.

The reaction disc 33 is mounted so that it rests against the surface formed by the rear faces of the base 80 and of the ring 81.

The reaction device is fixed to the pneumatic piston 13 by means of an annular washer 32 the central passage of which runs axially forwards in the form of a sleeve 32" bordering the smaller-diameter part 73 of the sleeve 72.

We are now going to describe the operation of the reaction device 135 according to FIG. 8 incorporated into a pneumatic brake booster.

Upon braking, for an input force value below a certain force Fe, the reaction device 135 behaves like a rigid piece. The reaction disc acts in a known way and combines the forces Fa, Fp and Fr and transmits the entire reaction to the actuating rod. The reaction device determines a first boost ratio.

For an input force value higher than Fe, the spring 30 deforms, allowing the ring 81 to slide forwards and therefore allowing the reaction disc 33 to expand forwards into the external annular part 76 defined by the outside diameter of the base 80 and the inside diameter of the part 75 of the sleeve 72.

There is therefore a change in the distribution of contact pressures in the surface of the rubber, and this reduces the contact pressure between the distributor 22 and the reaction disc 33, the reaction device determining a second boost ratio.

For a certain input force, the ring 81 comes to rest against the shoulder 77 and the booster therefore supplies a boost level equal to the first boost level obtained for a force Fa lower than the prestress of the spring.

Unlike the case of the first embodiments, the expansion of the reaction disc takes place via an external annular part 76 rather than via the central passage 51.

Figure 9:
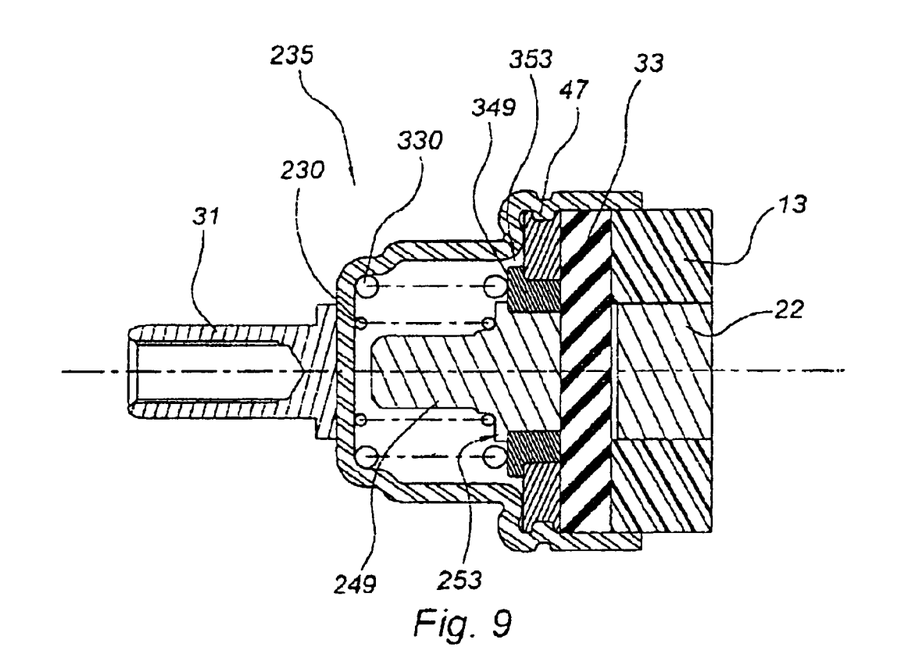
FIG. 9 is a view in longitudinal section of a third embodiment of a reaction device which can be used in a booster according to the present invention.

FIG. 9 shows a third embodiment of a reaction device which once again allows the boost ratio of the booster to be modified and in which the pneumatic piston 13 and the distributor 22 are depicted in part.

The reaction device 235 differs from the reaction device 35 of the first embodiment in that it comprises a composite floating piece 49 comprising a central first piece 249 and an annular second piece 349 sliding about the first piece 249. The first piece 249 includes stop means 253 that rest against and engage the front face of the second piece 349 and the second piece 349 includes stop means 353 that rest against and engage against the annular washer 47. A first spring 230 is mounted in compression between the rear face of the end wall of the cage 37 and the stop means 253, a second spring 330, with a prestress higher than that of the first spring 230, is mounted in compression between the rear face of the end wall of the cage 37 and the stop means 353, the spring 330 has an inside diameter greater than the outside diameter of the spring 230.

We are going to describe the operation of a pneumatic brake booster comprising the third embodiment of the reaction device according to the present invention.

Figure 10:
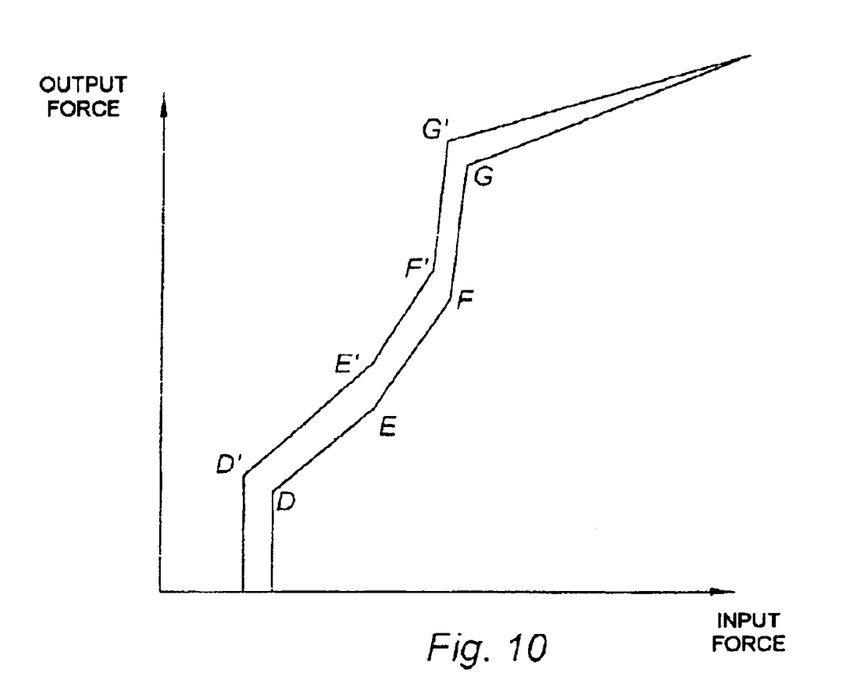
FIG. 10 is a curve representing the variation in output force as a function of the input force for a pneumatic brake booster comprising the reaction device of FIG. 9.

FIG. 10 shows the change in boost ratios as a function of the actuating force for the booster comprising the device according to the third embodiment.

For a value of input force below a certain force Fe, the reaction device 235 behaves as a rigid piece, the reaction device determining a first boost ratio represented by the curve portion DE. For an input force value higher than Fe and lower than a certain force Fd, the spring 230 compresses, allowing the reaction disc 33 to expand through the central passage 51, by the sliding-forwards of the floating piece 249. The reaction device determines a second boost ratio represented by the curve portion EF. For an input force higher than Fd, the spring 330 compresses, allowing the reaction disc 33 to expand axially forwards over an annular surface by displacement of the annular piece 349, the reaction device determines a third boost ratio represented by the curve portion FG. Next, for even higher input values, the front end of the floating piece 349 comes up against the rear face of the end wall of the cage 37 and the first boost ratio DE is had again. The start of this last stage appears according to the settings of the device, the start may lie before the saturation regional in the saturation region, the saturation region being the moment when the pressure in the working chamber reaches atmospheric pressure when there is no more additional boost, any increase in the actuating force resulting only in an increase in the output force by the value of the actuating force.

It must be clearly understood that the means 45 of prestressing at least one elastic means 30, 230, 330 are not restricted to an annular washer resting against a shoulder and fixed by crimping, but to any means of immobilization in a precise position, such as a washer and a screw for example.

It must be clearly understood that a device allowing firstly the annular ring and secondly the floating piece to move could be provided.

Figure 11A:
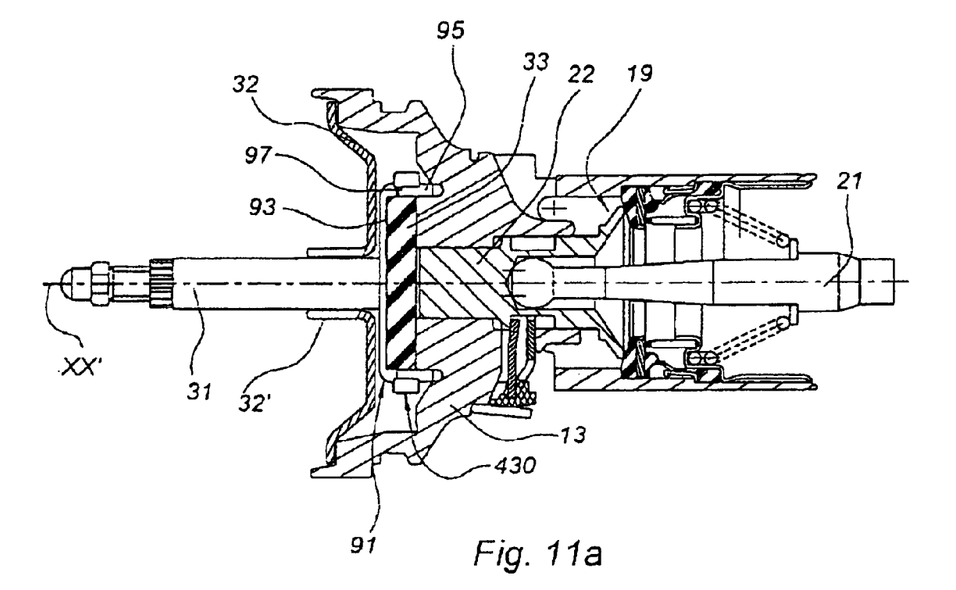
FIG. 11a is a view in longitudinal section of a fourth embodiment of a reaction device which can be used in a booster according to the present invention.
Figure 11B:
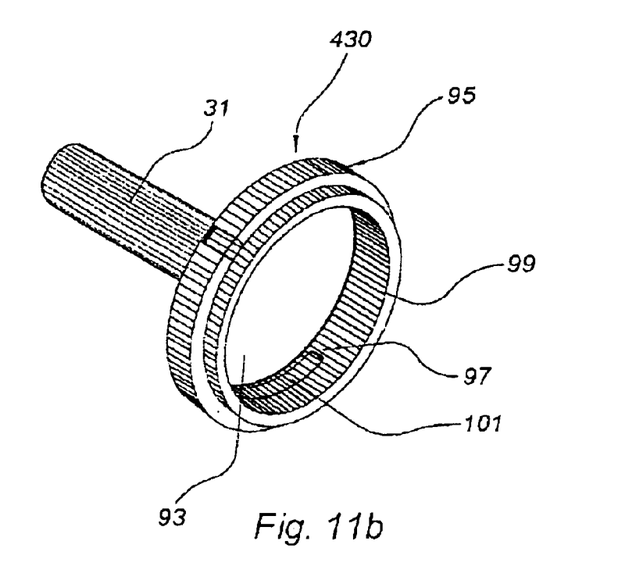
FIG. 11b is a three-quarters perspective view from the front of the housing of the reaction disc of the reaction device according to FIG. 11a, FIG. 12a depicts curves of the variation in actuating force as a function of the compression of the elastic means for three different thrust forces and three different reaction disc diameters with the same fixed reaction disc elastic modulus.

FIGS. 11a and 11b depict a fourth embodiment of the reaction device according to the present invention allowing the reaction disc to extend radially for an input force higher than a force Fe. The device comprises a reaction disc 33, a housing 91 for the reaction disc 33 and an elastic means 430. The housing 91 for the reaction disc is a receiving cup 91 secured via its axial front face to a push rod 31 of axis XX', the cup 91 being coaxial with the push rod 31.

The cup 91 comprises a front face 93 in the form of a disc perpendicular to the axis XX', with a coaxial sleeve 95 extending therefrom, the sleeve 95 includes, in its lateral periphery, angularly distributed recesses 97, advantageously uniformly distributed, and an elastic means 430 in the form of a preloaded elastic ring equipped on its interior face 99 with projecting tabs 101 collaborating with the recesses 97.

The reaction device is fixed to the pneumatic piston 13 by means of an annular washer 32 the central passage of which advantageously extends axially forwards in the form of a sleeve 32' bordering the push rod 31.

We are going to describe the operation of a pneumatic brake booster comprising the fourth embodiment of the reaction device according to the present invention.

The input forces below a certain force value Fe, the cup behaves as a rigid piece, the reaction device determining a first boost ratio.

For an input force higher than Fe, the ring deforms allowing the reaction disc 33 to expand via the recesses 97. There is then a change in the distribution of contact pressures in the surface of the rubber, reducing the contact pressure between the distributor 22 and the reaction disc 33, the reaction device determining a second boost ratio.

Figure 12A:
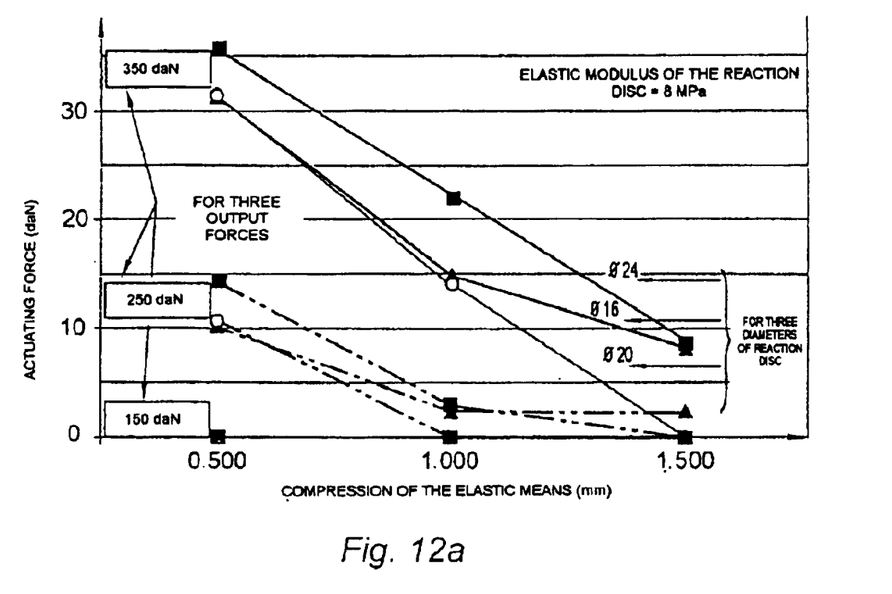
Figure 12B:
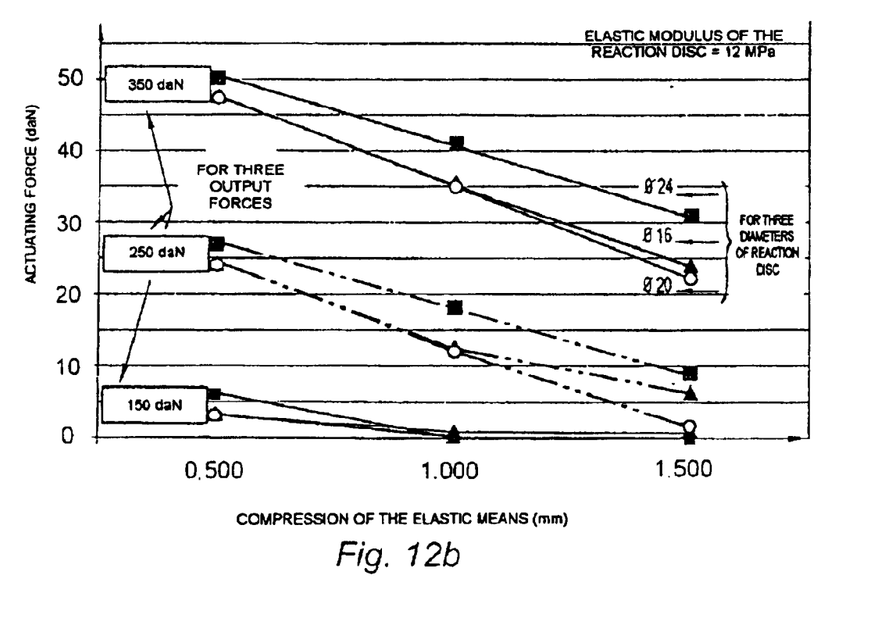

FIGS. 12a and 12b show the change in the value of the actuating force as a function of the compression of the elastic means 30, 230, 330, 430, 530.

Measurements of the force applied to the distributor as a function of the compression of the elastic means were taken, varying the output force, the elastic modulus of the reaction disc 33 and the diameter of the reaction disc 33. The actuating force is directly proportional to the input force on the brake pedal.

These characteristics show that when the elastic means compresses, the actuating force decreases and therefore, for the same output force, the boost ratio increases.

This proves the effectiveness of the reaction device according to the present invention applied to a pneumatic brake booster in causing the boost ratio of the booster to vary, the variation in boost ratio depending on the characteristics of the reaction disc.

The prestress on an elastic means is preferably greater than or equal to 150 newtons.

It must be clearly understood that the force value Fe given as being the limiting value of the input force for switching from a first boost ratio to a second boost ratio depends on the settings of the devices, on the size of the reaction disc, on the elastic modulus of the rubber of the reaction disc and on the elastic means used. The same is true of the value of the force Fd.

It must also be clearly understood that the present invention does not restrict itself to a reaction device with two or three different boost ratios but with the number of successive boost ratios needed to ensure effective and comfortable braking.

The present invention applies in particular to the motor industry.

The present invention applies mainly to the braking industry.

We claim:

1. A pneumatic brake booster having a casing (1) divided into a front chamber (7) and a rear chamber (9) by a sealed moving wall (11) of a pneumatic piston (13), said pneumatic piston (13) having a bore therein for retaining a three-way valve (19) that is actuated by an actuating rod (21) connected at a first end to a brake pedal and at a second end opposite the first end to a distributor (22), said three-way valve (19) on being actuated by said actuating rod (21) controlling the development of a pressure differential that moves said sealed wall (11) to create an actuation force that is provided as an output force for pressurizing fluid in a master cylinder to effect a brake application, characterized in that the distributor (22) contacts a reaction arrangement (235) through which the output force is communicated to the master cylinder and the output force is a functional ratio of said input force and wherein said functional ratio is modified by a reaction disc (33) and elastic means (230,330) during a brake application such that during the brake application said reaction arrangement (235) functions as a rigid member until the input force reaches a first predetermined input force level Fd and where a first boost ratio remains in effect until a second predetermined force level Fe is reached and a second boost ratio is in effect until a third predetermined input force level Ff is reached and a third boost ratio remains in effect until a fourth predetermined fource level is reached and as a result the output force is sequentially increased with increases in the input force, said reaction arrangement (235) including a cage (37) having a cylindrical body with a first diameter (39) separated from a second diameter (41) by a shoulder (43), said first diameter (39) being closed by an end that is connected to a push rod (31) through which an output force is communicated to the master cylinder; a first spring (230) of said elastic means has a first end that engages said end of said cage; a second spring (330) of said elastic means is concentric to said first spring (230) and has a first end that engages said end of said cage; a floating piece (49) consisting of a central first piece (249) and an annular second piece (340); a washer (47) that engages said shoulder (43), is fixed in said second diameter 41) of said cage (37) and engages said first piece (249) and second piece (340) to preload said first spring (230) and said second spring (330), said washer (47) having a central passage (51) for receiving said floating piece (49); said reaction disc (33) being located in said second diameter (41) and having a face that engages said washer (47), said second piece (340) and said first piece (249); said pneumatic piston (13) having an radial notch to define guide means (24) for receiving said second diameter (41) of said cage (37) to maintain said pptput push rod (31) in alignment with said distributor (22).

2. The pneumatic brake booster as recited in claim 1 wherein said pneumatic piston (13) acts through said reaction disc (33) to directly communiate actuation force into said cage (37) by way of washer (47) until said a first predetermined input force level Fd is reached.

3. The pneumatic brake booster as recited in claim 2 when said first predetermined input force level Pd is reached the pneumatic piston (13) additionally acts through said reaction disc (33) to overcome said first spring (230) and move said first piece (249) toward said end of the cage (37) while expanding into the space vacated by the first piece (249) and establish said second functional ratio.

4. The pneumatic brake booster as recited in claim 3 wherein when said second predetermined input force level Fe is reached the pneumatic piston (13) additionally acts through said reaction disc (33) to overcome said second spring (230) and move said second piece (340) toward said end of the cage (37) while expanding into the space vacated by the second piece (340) and establish said third boost ratio.

5. The pneumatic brake booster as recited in claim 4 wherein when said first predetermined input force level Fd is reached the pneumatic piston (13) additionally acts through said reaction disc (33) to move said first piece (249) into engagement with said end of the cage (37) and directly transmit said actuation force as an output force to said push rod (13) with said first boost ratio.

6. The pneumatic brake booster as recited in claim 5 wherein said first piece (249) has a flange 253 thereon that engages said second piece (340) to define a stop and locate said first piece in a position of rest with respect to said washer (47).

7. The pneumatic brake booster as recited in claim 6 wherein said second piece (340) has a flange (353) thereon that engages said washer (47) to define a stop and locate said second piece (340) in a position of rest.

\* \* \* \* \*